United States Patent [19]

Saito

[11] Patent Number: 5,099,099

[45] Date of Patent: Mar. 24, 1992

[54] PRESSURE APPLYING DEVICE FOR RESISTANCE WELDING

[76] Inventor: Akihiro Saito, 864, Nakashinden, Ebina-shi, Kanagawa, 243-04, Japan

[21] Appl. No.: 497,994

[22] Filed: Mar. 23, 1990

[30] Foreign Application Priority Data

Mar. 24, 1989 [JP] Japan .................................. 1-72168

[51] Int. Cl.$^5$ ................................................. B23K 9/28
[52] U.S. Cl. ...................................................... 219/89
[58] Field of Search ...................................... 219/89, 90

[56] References Cited

U.S. PATENT DOCUMENTS 3,679,859 7/1972 Comeau ................................ 219/90
4,825,031 4/1989 Heideman ............................ 219/89

OTHER PUBLICATIONS

"New Automotive Engineers' Handbook", Society of Automotive Engineers of Japan, Inc., 1983, vol. 9, title pages, pp. 9-1 to 9-3, pp. 1-42 and 1-43, and enlarged Figure 1-63.

Primary Examiner—Marvin M. Lateef
Attorney, Agent, or Firm—Flynn, Thiel, Boutell & Tanis

[57] ABSTRACT

Pressure applying device for resistance welding which includes a pair of two gun arms having an electrode tip at two opposed ends of the arms, a flexible supporting means connecting said two arms, an actuator provided between said two arms, and a link mechanism connecting said two arms to define movement of the electrode tip. According to this invention, the operation of said actuator to pull the gun arm allows the electrode tips in the open position as well as the supporting means accumulating resilience. And, the reverse operation of said actuator can provide an elastic force by said flexible supporting means acting on the pieces between the electrodes, in addition to the welding pressure by the actuator.

20 Claims, 3 Drawing Sheets

PRESSURE APPLYING DEVICE FOR RESISTANCE WELDING

BACKGROUND OF THE INVENTION

1. Technical Field of the Invention

This invention relates generally to a pressure applying device for resistance welding, and more particularly to a pressure applying device for use in welding robots.

2. Prior Art

In order to provide better operability in welding process with minimized influences due to inertia force, the pressure applying devices for welding robots are required to be constructed into a smaller and lighter device. However, to achieve good resistance welding results, it is desired that greater welding force by electrode tips acts on the parts to be welded at the time of welding.

In conventional welding pressure applying devices, some attempts were made for improvement. For example, the selection of aluminum alloy having a small specific gravity for a gun arm material, or the forming of ribs on the arm for reinforcement purpose, or the use of a reinforcement material for a lightweight device with great stiffness.

However, the gun arm of the welding pressure applying device has a complicated shape, and it is inevitable to use iron castings generally with low stiffness. Even with the above improvement, a hinge portion of the device, especially of the X-type device, which includes a pin, a pin hole, a bushing, etc., and acts as a supporting point when welding pressure is applied, often experiences a remarkable wear because great force is repeatedly applied. And, the supporting means of the conventional device often exhibits a mechanical play which may cause misalignment between the ends of paired electrode tips, resulting in a poor welding accuracy and a shortened life of the device.

OBJECT OF THE INVENTION

Accordingly, it is an object of the present invention to provide a pressure applying device for resistance welding which has a small size and light weight and can produce a great welding pressure and a good welding accuracy without causing the above problem with such hinge portion.

DETAILED DESCRIPTION OF THE INVENTION

Figure 1:
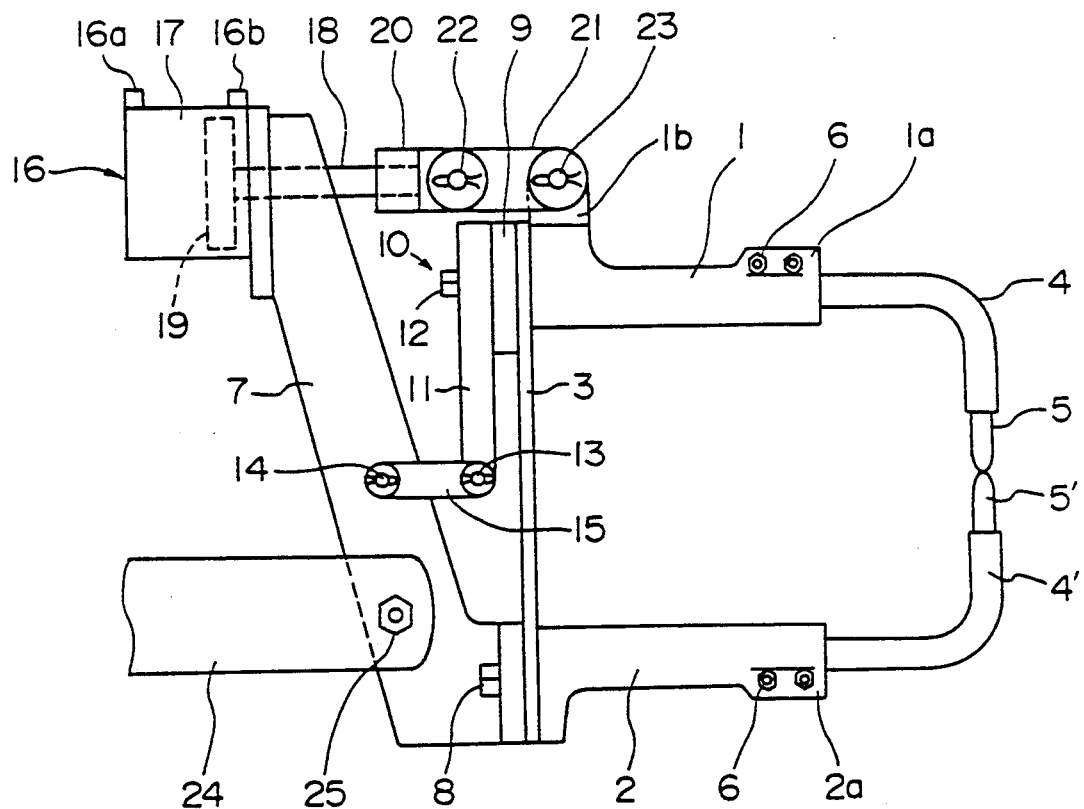
FIG. 1 is a view in front elevation of a first preferred embodiment of the pressure applying device for resistance welding according to the present invention.

A first preferred embodiment of this invention is described below in detail with reference to FIGS. 1 through 3. In this resistance-welding pressure applying device, gun arms 1, 2 made of aluminum alloy, for example, are provided parallel to each other. A leaf spring 3 which is provided to function as a flexible supporting means also connects the bases of the arms as described below. At the other ends of the arms, holding portions 1a, 2a are provided with a slit respectively. In the vicinity of the base of the upper gun arm 1, an upwardly extending connection portion 1b is provided.

To the holding portions 1a, 2a of the arms 1, 2, the bases of electrode tip holders 4, 4' which are made of a material exhibiting small deflection and good electrical conductivity and are bent at right angles are fitted and fastened with bolts 6, so that electrode tips 5, 5' attached to the tip holders 4, 4' are placed opposite to each other.

The above described leaf spring 3 is made of a plastic-based composite material, for example, and has a spring factor of a relatively large value.

Figure 6:
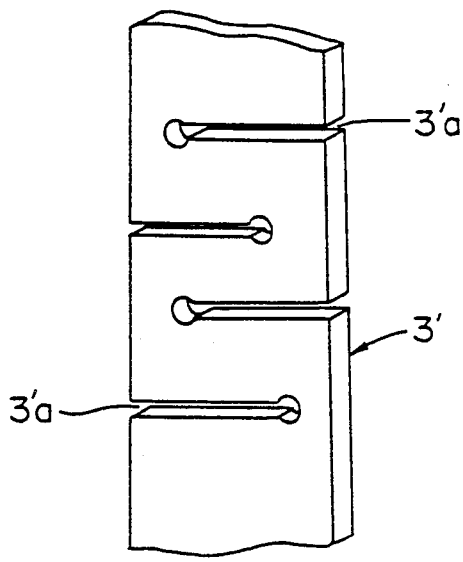
FIG. 6 is a partial perspective view of a modified supporting means.

In the case of a leaf spring of spring steel, it may be formed into a member of laminated thin leaves. Or, a leaf spring 3', as shown in FIG. 6, in which slits 3'a are formed alternately on left side or right side at right angles to the longitudinal direction would be able to present a larger deflection of the spring.

Further, a leaf spring in which slits are formed alternately on front side or reverse side in thickness direction in a similar manner would also be able to provide the same effect.

The lower gun arm 2 and the spring 3's lower end portion are secured with a bolt 8 to the bottom of a vertical supporting frame 7 which is extending from the lower arm 2. The spring 3's upper end portion and a spacer 9, and fixed links 11 of a link mechanism 10 are fixed with a bolt 12 to the base of the upper arm 1. The leaf spring 3 in the installed condition as described above is adapted to provide a certain welding pressure or preliminary pressure to the electrode tips 5, 5' via the tip holders 4, 4' and the arms 1, 2. An actuator as described below can be made smaller in size if this preliminary pressure is made greater. Practically, however, the experimental results showed that setting the preliminary pressure to approximately one third of the welding pressure required for the welding is suitable.

The link mechanism 10 comprises a pair of two fixed links 11 being put downwardly in a position parallel to the leaf spring 3, and a pair of two movable links 15 connected at one end to the lower ends of the fixed links 11 by a shaft 13 and connected at the other end to the supporting frame 7 by a shaft 14. These links 11 and 15 in the link mechanism 10 which are constructed from metal sheets of relatively large thickness define movement of the leading end of the electrode tip 5 through the arm 1. The link mechanism also helps increase the lateral stiffness of the spring 3 in a direction perpendicular to the plane passing through the arms 1, 2, to eliminate the torsional deformation of the leaf spring 3, withstand a force parallel to the arms 1, 2, and to prevent misalignment of the electrode tips 5, 5'.

An actuator 16 is provided at the upper end portion of the supporting frame 7. This actuator 16 for example comprises a cylinder 17 including compressed air openings 16a, 16b and a piston 19, attached to an operating rod 18, which is adapted slidable in the cylinder. The end of the rod 18 extending further from the cylinder 17 is connected to one end of a link member 20, and the other end of the member 20 is connected to a link member 21 and further to the arm 1's connection 1b by shafts 22 and 23.

A supporting member 24 for the above welding pressure applying device is secured at one end with a bolt 25 to the supporting frame, and at the other end connected to the arm of a welding robot (not shown in the figure) for example.

Figure 2:
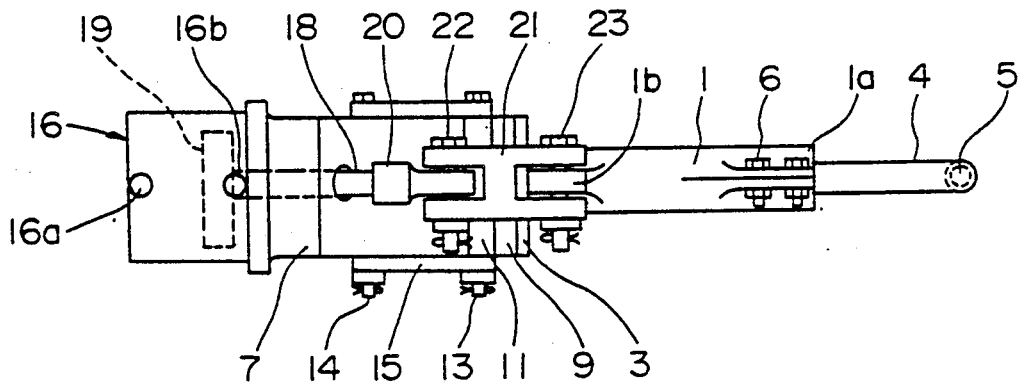
FIG. 2 is a plan view of this device according to the above embodiment of the invention.

In the above described embodiment, the device shown in FIGS. 1 and 2 is in a condition when no compressed air is supplied into the actuator 16. At this position of the device, a pressure only by the leaf spring 3 is acting on the electrode tips 5, 5'.

At this position of the welding pressure applying device, supplying compressed air from the hole 16b of the actuator 16 into the cylinder 17 and exhausting air from the hole 16a would allow the piston 16 to move to the left. This causes the operating rod 18 to pull the arm 1 via the link members 20, 21. As shown in FIG. 3, the leaf spring 3 at this time deflects to the left under compression, and the electrode tip 5 of the gun arm 1 separates from the tip 5'. The leaf spring 3 at this stage accumulates resilience energy. And the link mechanism 10 rotates as shown in FIG. 3 to define movement of the electrode tips 5, 5'.

Figure 3:
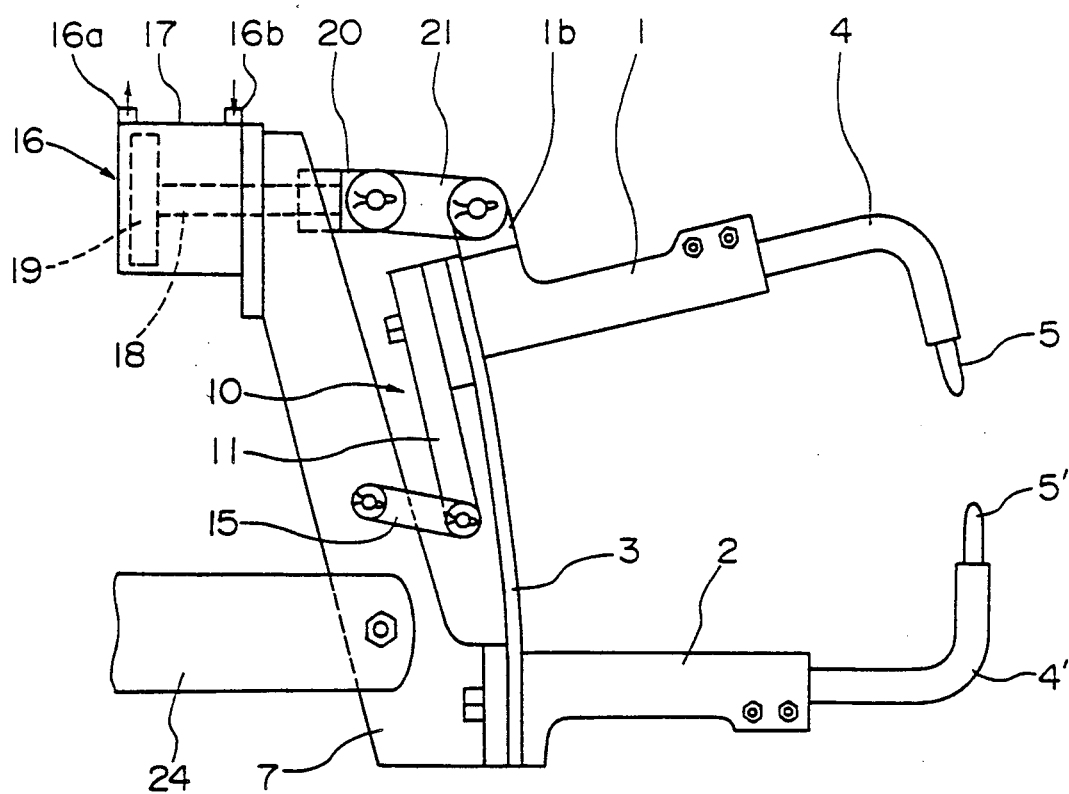
FIG. 3 is a view in front elevation of this device when the electrode tips are in the open position.

When the electrode tips 5, 5' are in the open position shown in FIG. 3, the parts to be welded (not shown) are positioned to this place. At this stage, supplying compressed air from the hole 16a of the actuator 16 into the cylinder 17 and exhausting air from the hole 16b would permit the piston 18 to move to the right. In a similar manner, the arm 1 is pushed to the right via the link members 20, 21 by the operating rod 18. This causes the leaf spring 3 acting as the flexible supporting means while receiving tension. The leaf spring which was bent as in FIG. 3 returns back by the accumulated resilience in the spring. Therefore, the pressure by the actuator 16, added to this elastic force by the energy accumulated in the leaf spring, acts on the electrode tips 5, 5' at the ends of the arms 1, 2.

At the same time, the link mechanism 10 rotates from the position in FIG. 3 to that in FIG. 1. The link mechanism acts to permit a free movement of the leaf spring 3 while eliminating its torsional deformation, as well as to prevent misalignment of the tips 5, 5' while withstanding a force parallel to the arm 1 and defining movement of the tip 5 at the end of the arm.

The returning action of the supporting means in addition to the pressure by the actuator facilitates correction of the surfaces of the parts to be welded to put a contact running-in effect on the surfaces. And, the application of the welding pressure at the weld time is in good agreement with a rapid expansion and shrinkage of metal when a nugget is formed.

When the welding is completed, compressed air is supplied from the actuator 16's hole 16b into the cylinder 17 and air is exhausted from the hole 16a to permit the piston 19 to move to the left. This results in the pulling back of the arm 1 by the operating rod 18 via the link members 20, 21. As in FIG. 3, the leaf spring 3 which acts as a supporting-point member under compression causes the tip 5 at the end of the arm 1 to separate from the other tip 5'.

By repeating the foregoing procedure, the welding operations can be continued.

A second preferred embodiment of the present invention is described below with reference to FIGS. 4 and 5. This device employs as the spring which serves as the flexible supporting means a coil spring 30 instead of the leaf spring 3 of the first embodiment, and uses gun arms 31, 32 which are longer than those of the first embodiment. The coil spring is provided at a portion near the mid point of the arm on the tip's side, and the link mechanism 33 is connected to the arms adjacent to said spring. To the bases of the arms 31, 32, an actuator 34 and link members 35, 36, 37 are connected.

The coil spring 30, made of spring steel with a large spring constant and closely coiled, is mounted at both ends on the arms 31, 32 with end fittings 31a. And the coil spring 30 in a mounted condition as shown in FIG. 4 is slightly curved toward the tips 5, 5' so that a preliminary pressure acts on the electrode tips 5, 5' at the ends of the arms 31, 32 via the tip holders 4, 4'. As described above, the preliminary pressure is set to approximately one third of the necessary pressure for the welding.

The link mechanism 33 comprises a set of two long and short fixed links 38, 39 the bases of which are mounted on the arms 32, 31 respectively in the vicinity of the coil spring 30, and a set of two movable links 40 connecting the free ends of the links 38, 39 at shafts 41, 42. Similar to those with the first embodiment, these links 38, 39, 40 which are constructed from metal sheets of relatively large thickness have an increased lateral stiffness in a direction perpendicular to the plane passing through the arms 31, 32 and define movement of the arms 31, 32.

Similar to the first embodiment shown in FIGS. 1 to 3, the actuator 34 is mounted to the gun arm 32, and includes, for example, a cylinder 43 with compressed air openings 34a, 34b and a piston 45 with an operating rod 44 attached, which piston is adapted slidable in the cylinder. The end of the rod 44 is connected to one end of a link member 35, and the other end of the member 35 is connected to link members 36, 37 by shafts 46, 47, which are mounted to the arm 31.

Figure 4:
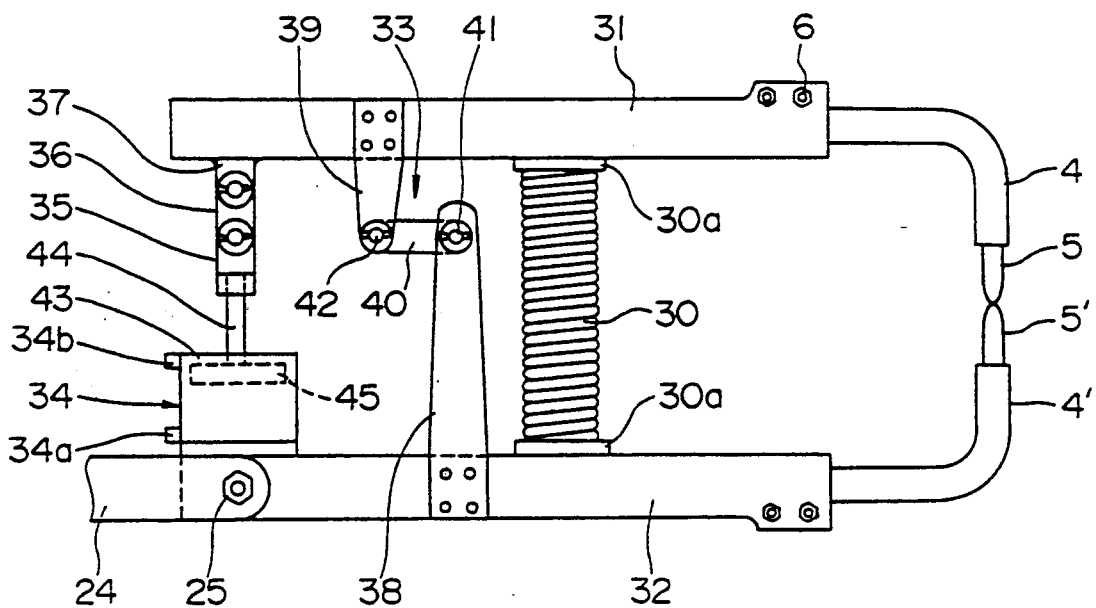
FIG. 4 is a view in front elevation of a second preferred embodiment of the pressure applying device for resistance welding according to the invention.
Figure 5:
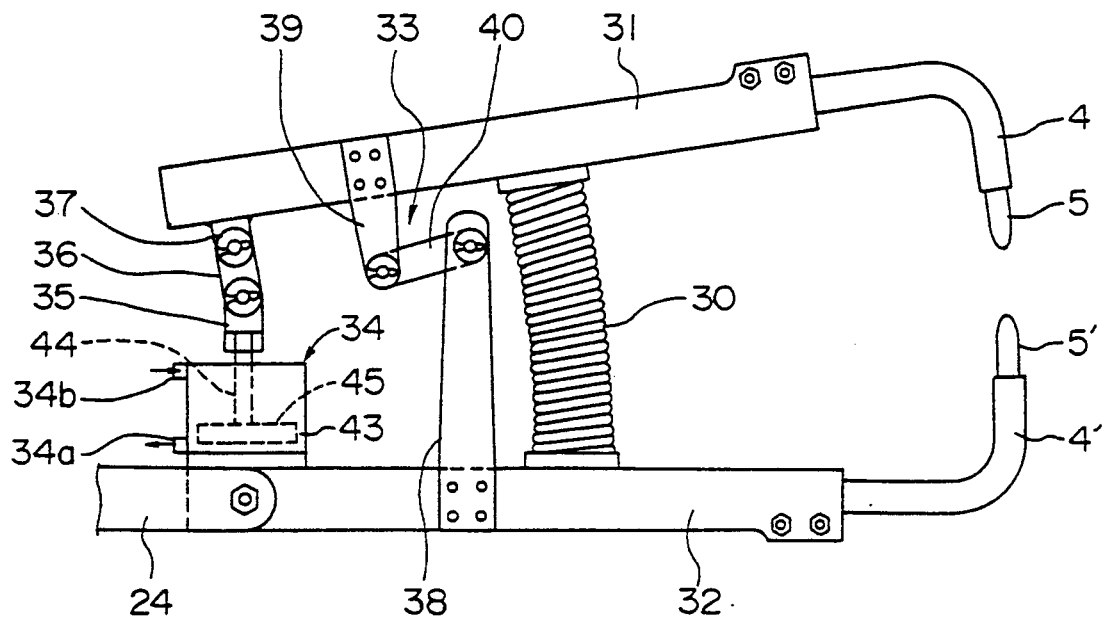
FIG. 5 is a view in front elevation of this device when the electrode tips are in the open position.

In this embodiment in FIGS. 4 and 5, similar to that in FIGS. 1 to 3, the actuator 34 in a condition that compressed air is not supplied into the actuator and a preliminary pressure only by the coil spring 30 is acting on the electrode tips 5, 5' is operated by supplying compressed air to the cylinder 17 from the hole 34b and exhausting air from the hole 34a, so that the piston 45 moves downward to pull down the arm 31 in conjunction with the link members 35, 36, 37 via the rod 44. This causes the coil spring 30 to bend in a direction toward the left under compression, and the electrode tip 5 at the leading end of the arm 31 separates from the other tip 5'. The coil spring 30 during this movement accumulates resilience energy. The link mechanism 33 defines this movement of the electrode tips 5, 5', as shown in FIG. 5.

With the electrode tips 5, 5' in the open position as in FIG. 5, positioning the pieces to be welded (not shown) in place and supplying compressed air into the cylinder 43 from the hole 34a of the actuator 34 and exhausting air from the hole 34b would allow the piston 45 to move upward, and the arm 31 is pushed upward by the operating rod 44 and the link members 35, 36, 37. This results in tensile force on the coil spring 30 as a supporting means during movement. At the same time, this supporting means which was bent as shown in FIG. 5 is to return back owing to the accumulated resilience. Therefore, the elastic force by the coil spring 30 in addition to the pressure by the actuator 34 will act on the electrode tips 5, 5' at the ends of the arms 31, 32.

The link mechanism 33 which at this stage rotates from the position in FIG. 5 to that in FIG. 4 allows a free deflection of the coil spring 30, but provides support to prevent the torsion of the spring while withstanding a force parallel with the arm 31. This mechanism is adapted to define movement of the electrode tip 5 in operation, and provides support to eliminate misalignment of the tips 5, 5'.

The return action of coil spring 50 owing to the elastic strain energy accumulated in this supporting means, in addition to the pressure by the actuator, facilitates correction of the surfaces of the pieces to be welded to put a contact running-in effect on the surfaces. And, the application of the welding pressure at the weld time is in good agreement with a rapid expansion and shrinkage of metal when a nugget is formed.

When the welding is completed, supplying compressed air into the cylinder 43 from the hole 34b of actuator 34 and exhausting air from the hole 34a would cause a downward movement of the piston 45. The arm 31 is pulled downward via the rod 44 and the members 35, 36, 37. The coil spring 30 acts as the supporting means during movement under compression, causing the tip 5 at the end of the arm 31 to separate from the other tip 5'.

By repeating the foregoing procedure, the welding operations can be continued.

In the foregoing description, a leaf spring as well as a coil spring is given as an example of the flexible supporting means. However, a rubber spring may be used if it is capable of withstanding the above described compressive and tensile forces. And, the actuator which operates by compressed air pressure is given in the foregoing. However, other modifications and variations are also applicable. For example, an actuator which operates by other fluid pressure such as oil pressure, vacuum pressure, or one that operates by electromagnetic force may be applied to the device.

The resistance-welding pressure applying device constructed in accordance with the present invention can provide a great welding pressure and a high welding accuracy by making one of a small-sized, light-weight device having a good stiffness. This device, as described above, comprises a pair of two gun arms having an electrode tip at two opposed ends of the arms, a flexible supporting means connecting said arms, an actuator provided between said arms, and a link mechanism connecting said arms to define movement of the electrode tip. The flexible supporting means which acts as a supporting point during rotary movement of the arm can prevent such a wear and resultant mechanical play that the hinge portion of conventional devices often experiences. And, the use of the supporting means in conjunction with the actuator can provide a remarkably large welding force. Furthermore, if the welding force is set to the same level as conventional devices, this pressure applying device can be constructed into a small-sized, light-weight one. In addition, said link mechanism connecting the two arms to define movement of the electrode tip provides effective support to eliminate misalignment between the electrode tips, thereby achieving a better welding accuracy.

What is claimed is:

1. A pressure applying device for resistance welding which comprises: two spaced arms each having thereon a respective electrode tip, an elongate flexible member supporting said arms for relative movement between first and second positions in which said electrode tips are respectively adjacent and spaced, said arms being fixedly connected to said flexible member at respective locations which are spaced from each other along said flexible member and are spaced from said electrode tips, said flexible member having inherent resilience which continuously yieldably urges relative movement of said arms causing said electrode tips to move toward each other, movement of said arms from said first position to said second position causing said flexible member to be flexed, actuator means cooperable with said arms for moving said arms from said first position to said second position against the urging of said flexible member, and means cooperable with said arms for minimizing relative movement of said electrode tips in directions substantially perpendicular to a direction in which said electrode tips are spaced when said arms are in said second position, said means for minimizing relative movement including a link mechanism coupled to each of said arms.

2. The pressure applying device for resistance welding in accordance with claim 1, wherein said actuator means includes a fluid-actuated device having a cylinder which is fixedly supported on one of said arms and which has therein a movable piston having fixedly supported thereon an actuator rod which extends outwardly through an opening in said cylinder, and means pivotally coupling an end of said actuator rod remote from said piston to the other of said arms.

3. The pressure applying device for resistance welding in accordance with claims 1, wherein said flexible member is a leaf spring.

4. The pressure applying device for resistance welding in accordance with claim 1, wherein said flexible member is a coil spring.

5. The pressure applying device for resistance welding in accordance with claim 1, wherein said flexible member is a rubber spring.

6. The pressure applying device for resistance welding in accordance with claim 1, wherein said link mechanism has a high stiffness.

7. The pressure applying device for resistance welding in accordance with claim 1, wherein said actuator includes a pneumatic cylinder which operates by air pressure.

8. The pressure applying device for resistance welding in accordance with claim 1, wherein said actuator operates in response to changes in an oil pressure.

9. The pressure applying device for resistance welding in accordance with claim 1, wherein said actuator is electrically activated.

10. The pressure applying device for resistance welding in accordance with claim 1, wherein said link mechanism includes two transversely spaced link members which each have a first end supported on a first of said arms for pivotal movement about a common transversely extending first pivot axis, and which each have a second end supported on a second of said arms for pivotal movement about a common transversely extending second pivot axis which is spaced from and extends parallel to said first pivot axis.

11. The pressure applying device for resistance welding in accordance with claim 10, wherein said first arm includes a holding portion and includes two transversely spaced link portions which are each fixedly supported on and extend outwardly from said holding portion, each of said link members being pivotally coupled to a respective one of said link portions of said first arm for pivotal movement relative thereto about said first pivot axis.

12. The pressure applying device for resistance welding in accordance with claim 11, wherein said second arm includes a holding portion and includes two transversely spaced link portions which are each fixedly supported on and extend outwardly from said holding portion, each of said link members being pivotally coupled to a respective one of said link portions of said second arm for pivotal movement relative thereto about said second pivot axis.

13. The pressure applying device for resistance welding in accordance with claim 1, wherein said elongate flexible member has therein a plurality of transversely extending slits provided at spaced locations therealong.

14. A pressure applying device for resistance welding which comprises a pair of two spaced gun arms extending approximately parallel to each other and having an electrode tip at two opposed ends of the arms, a spring which serves as supporting means for connecting said two arms in a manner to facilitate relative movement and produce preliminary pressure urging said electrode tips toward each other, an actuator provided between rear ends of said two arms, and a link mechanism with high lateral rigidity connecting said two arms to define movement of the electrode tips.

15. The pressure applying device for resistance welding in accordance with claim 14, wherein said actuator operates in response to changes in an oil pressure.

16. The pressure applying device for resistance welding in accordance with claim 14, wherein said actuator is electrically activated.

17. The pressure applying device for resistance welding in accordance with claim 14, wherein said supporting means is a leaf spring.

18. The pressure applying device for resistance welding in accordance with claim 14, wherein said spring is a coil spring.

19. The pressure applying device for resistance welding in accordance with claim 14, wherein said spring is a rubber spring.

20. The pressure applying device for resistance welding in accordance with claim 14, wherein said actuator includes a pneumatic cylinder which operates by air pressure.

* * * * *